Oct. 6, 1964     B. E. OZINGA     3,151,492

SPEED REGULATING MECHANISM

Filed Dec. 7, 1962     2 Sheets-Sheet 1

Inventor:
Bernardo E. Ozinga,
By Henry J. Marciniak
Attorney.

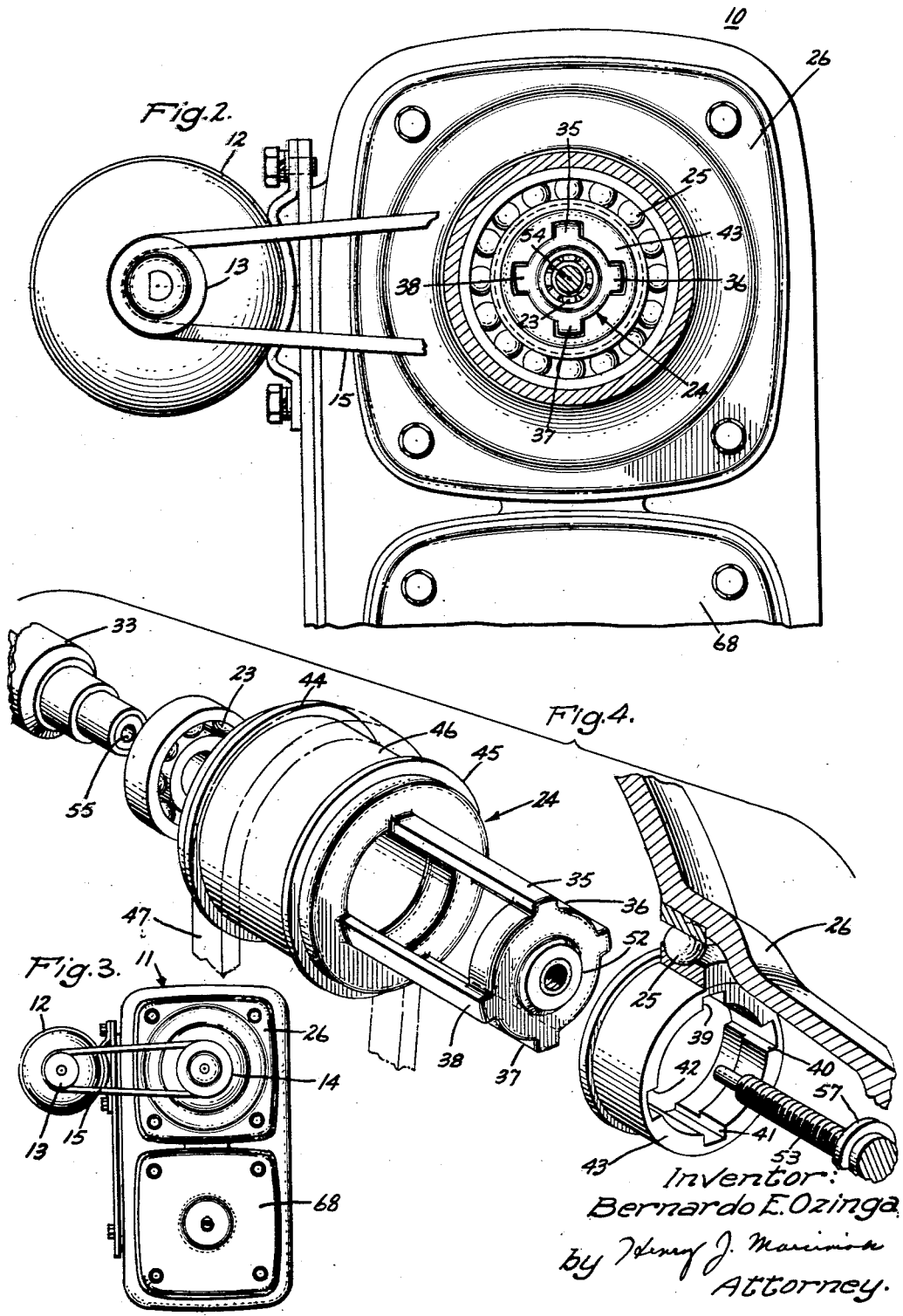

United States Patent Office 3,151,492
Patented Oct. 6, 1964

3,151,492
SPEED REGULATING MECHANISM
Bernardo E. Ozinga, Maywood, N.J., assignor to General
Electric Company, a corporation of New York
Filed Dec. 7, 1962, Ser. No. 243,054
8 Claims. (Cl. 74—230.17)

This invention relates to speed regulating mechanisms and more particularly to such mechanisms in which a speed input is converted to a selected substantially constant speed output.

In many power drive applications it is desirable, if not necessary, to drive a machine at a desired substantially constant or regulated speed. For example, where it is desired to drive an alternator from an internal combustion engine of an automobile or truck as the engine is operated over a wide range of speeds, the alternator must be operated at a substantially constant speed despite changes in the engine speed. Another example of applications where the speed regulating mechanisms to which the present invention relates may be used, is a variable output speed drive wherein the speed is regulated over a range of selected output speeds and may be maintained constant at any selected speed within the range.

It will be appreciated that a speed regulating mechanism must include a means for sensing deviations in the output speed at which it is desired to drive the output shaft. When any deviation from the selected speed occurs, it is necessary, of course, that the mechanism automatically compensates for the changes in the speed that may occur to maintain the output speed at the selected level. Thus, the mechanism must essentially comprise a closed loop system with a feedback of the speed of the output shaft, a means for comparing the actual output speed with a reference speed and a means for automatically correcting the output speed.

Preferably, it is desirable that the mechanism be constructed of essentially mechanical and relatively inexpensive and reliable components that can be readily assembled and disassembled. In addition to being rugged and simple in construction, it is also desirable that the speed regulating mechanism be such that the performance is not critically dependent on any of the mechanical parts. Further, the performance of the mechanism should not be substantially affected by normal load variations. Since the user of the apparatus may be periodically required to maintain the components, it is also desirable that the parts be so arranged that they are readily accessible for inspection and renewal if necessary.

Accordingly, it is a general object of the invention to provide an improved speed regulating mechanism in which deviations in the output speed of the mechanism from a selected speed level are automatically compensated for by the mechanism.

It is another object of the invention to provide an improved speed regulating mechanism in which the output speed is maintained essentially at a desired speed level irrespective of a relatively wide range of speed changes of the input or driving shaft of the mechanism.

Another object of the present invention is to provide an improved speed regulating mechanism constructed of rugged and relatively simple mechanical components in which close regulation of the output speed is achieved over a range of output speeds.

It is still another object of the invention to provide an improved speed regulating mechanism in which the performance of the mechanism is not substantially affected by normal load variations.

In carrying out one form of my invention, I have provided a speed regulating mechanism which includes a variable ratio speed drive having a driving shaft, a driven shaft, sheave structures respectively mounted on the shafts and a belt operatively connecting the sheave structures. Each of the sheave structures has an axially shiftable or movable pulley section, and the speed ratio of the speed ratio drive is varied by adjusting the shiftable pulley sections. To shift the movable pulley section of one of the sheave structures, an actuating member is provided on one of the movable pulley sections. This actuating member is formed with a threaded portion and is rotated at a speed proportional to the speed of the driven shaft. To maintain the speed of the driven shaft substantially constant at a selected value, the speed of the actuating member is compared with the rotational speed of a reference speed member which has a threaded portion engaging the threaded portion of the actuating member. Relative rotation between the actuating member and the reference member causes the movable pulley section to be shifted thereby changing the speed ratio of the sheave structures and compensating for deviations in the speed of the driven shaft from the selected value. The movable pulley section of the other sheave structure may be spring biased. Thus, the effective diameter of the sheave structure with which the spring biased pulley section is associated may be adjusted in response to the changes in the effective diameter of the other sheave structure controlled by the actuating member.

According to a more specific aspect of the invention, the actuating member is rotatably mounted on the sheave structure carried by the driving shaft. A belt and pulley drive is provided to cause the actuating member to be driven proportionally to the speed of the driven shaft. Such a speed feedback arrangement results in a construction that is relatively simple, rugged and reliable.

The subject matter which I regard as my invention is particularly pointed out and distinctly claimed in the concluding portion of the specification. My invention, however, both as to organization and method of operation, together with further objects and advantages thereof, may be best understood by reference to the following description taken in conjunction with the accompanying drawings in which:

FIGURE 2 is a side elevational view of the speed regulating mechanism embodying the invention, the view being partially broken away and partially in section to show details;

FIGURE 3 is a side elevational view of the speed regulating mechanism corresponding to the view shown in FIGURE 2; and FIGURE 4 is an exploded view of the actuating member and its associated parts which are shown in preassembled relation with the speed regulating mechanism illustrated in FIGURE 1.

Figure 1:
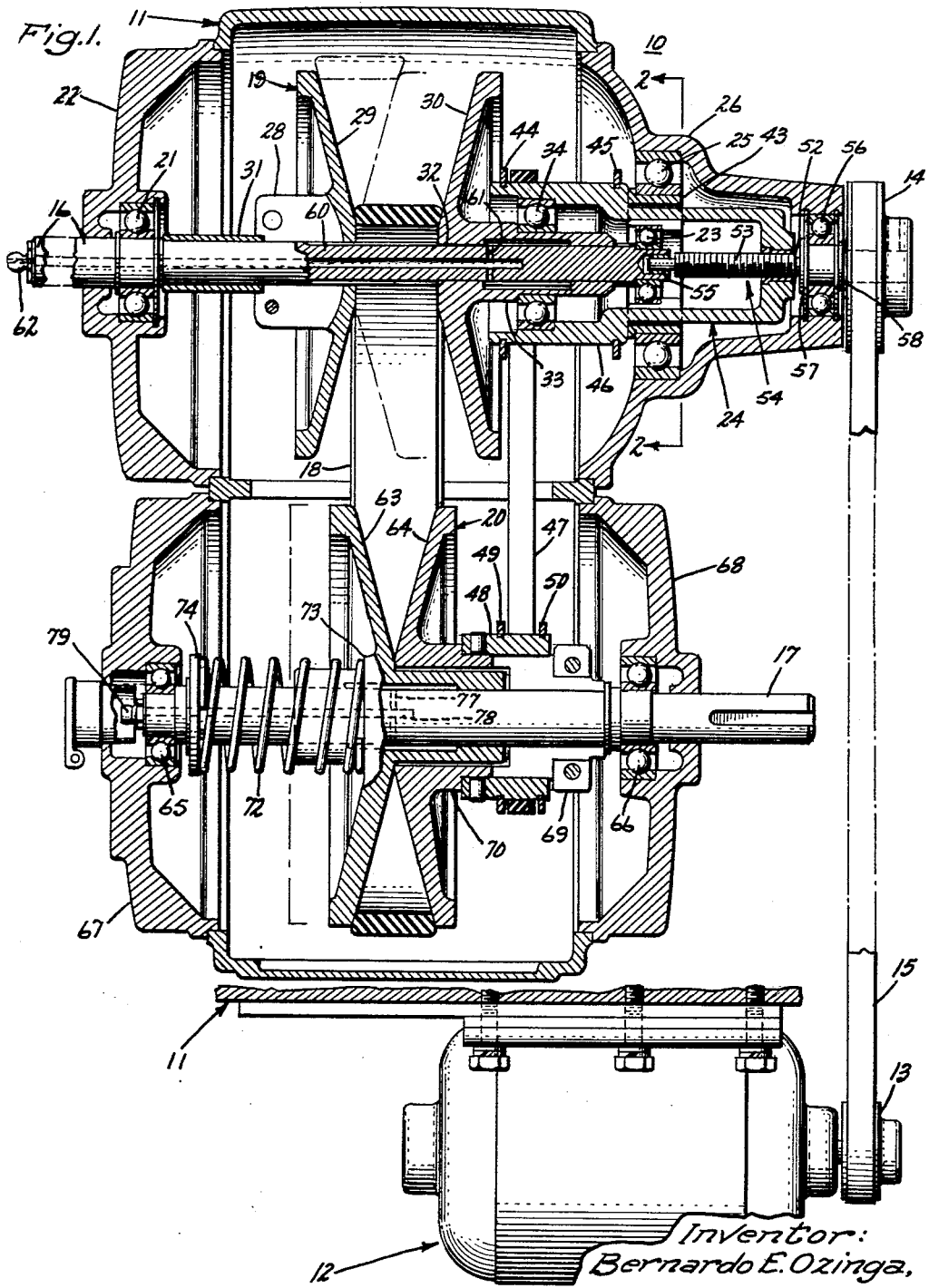
FIGURE 1 is a sectionalized view of the speed regulating mechanism embodying the invention, the motor being shown out of its normal position on the housing to more clearly illustrate its functional relationship to the mechanism.

Referring now to FIGURES 1, 2 and 3, I have illustrated therein a speed regulating mechanism 10 embodying one form of the invention. The mechanism 10 includes a main housing or frame 11 within which are mounted the operating components of the mechanism 10. On the external periphery of the main housing 11 I have mounted an electric motor 12, which supplies a selected reference speed against which the mechanism 10 compares the actual output speed to maintain the output speed of the mechanism 10 at a selected value. As is shown in FIGURE 2, the motor 12 is mounted on the main housing 11 and is coupled with the speed regulating mechanism 10 by means of a timing belt and pulley arrangement that includes a driving pulley 13 on the motor 12, a driven pulley 14 and a belt 15 operatively connecting the pulleys 13 and 14.

It will be seen in that speed regulating mechanism 10 includes a driving shaft 16 and a driven or output shaft 17. Shaft 17 is driven by the driving shaft 16 through a variable pitch drive which includes a wedge-shaped belt 18 and variable pitch sheave structures 19 and 20 mounted respectively on the driving and driven shafts 16 and 17. As will be hereinafter more fully explained, the variable pitch drive comprised of the sheave structures 19, 20 and the belt 18 is controlled by a feedback arrangement which causes the speed ratio between the driving 16 and driven shaft 17 to be varied in response to deviations in the speed of the driven shaft 17 from a selected value to thereby regulate the speed of the driven shaft 17.

The speed regulating mechanism 10 is driven by means of a driver (not shown) connected to the driving shaft 16. The driver may be, for example, an internal combustion engine or an electric motor. It will be seen that the driving shaft 16 is rotatably mounted by means of ball bearing assembly 21 supported in a removable end plate 22 and a ball bearing assembly 23 carried by a slotted member 43 and a ball bearing assembly 25. An actuating member 24 is slidably engaged in the slotted member 43. As shown, the sheave structure 19 includes a pair of oppositely disposed cone-shaped or inclined pulley sections 29 and 30. The left hand pulley section 29 is axially fixed with respect to the driving shaft 16, its hub 28 being rigidly attached to the shaft 16 for rotation therewith and being rigidly fixed in an axial position by the sleeve member 31 positioned between a collar formed on the shaft 16 and the recessed section of the hub 28.

The movable pulley section 30 is arranged for rotation with the shaft 16, but unlike the fixed pulley section 29, it is adapted to be shifted axially along the shaft 16. The connection of the hub 33 is made by axially extending splines 32 that engage the shaft 16 so that the pulley section 30 rotates with the shaft 16 and is allowed to move axially along the shaft 16 as controlled by the actuating member 24.

It will be seen that the actuating member 24 is rotatably carried by a bearing assembly 34 on the hub 33 of the pulley section 30 and by the threaded portion 52 supported by member 54. The actuating member 24 is free to rotate with respect to the movable pulley section 30 and is constrained to move axially with the pulley section 30. As is shown in the exploded view of FIGURE 4, the actuating member 24 is formed with splines 35, 36, 37 and 38 which are movably disposed in slots 39, 40, 41 and 42 formed in the slotted sleeve member 43.

As is shown in FIGURES 1 and 4, the outer cylindrical surface of the actuating member 24 is provided with a pair of flanges 44 and 45 to define a relatively wide pulley 46 in order to maintain engagement with a belt 47, as the actuating member 24 is shifted axially with respect to the drive shaft 16. The belt 47 is operatively connected with a pulley 48 which is provided with a pair of flanges 49 and 50 to constrain the lateral movement of the belt 47. In the illustrated exemplification of the invention, the actuating member 24 was driven proportionally to the rotational speed of the driven shaft 17 in a speed ratio of 1/1.

Referring again to FIGURE 4, it will be seen that the splined section of the actuating member 24 has an internally threaded portion 52. As is shown in FIGURE 1, the threaded portion 52 of the actuating member 24 engages or is meshed with a threaded portion 53 formed externally on a reference speed member 54. The threaded portion 53 serves as a jack screw to shift the actuating member 24 in either direction. As shown, the actuating member 24 is in the extreme right position of its axial movement.

The reference speed member 54 is rotatably carried at one end by a bushing 55 supported in the right end of the drive shaft 16 and by a bearing assembly 56 supported by the end plate 26. It will be noted that the reference speed member 54 is restrained from any axial movement relative to the main housing 11 by the thrust collars 57, 58 and the bearing assembly 56. Both the actuating member 24 and the speed reference member 54 are driven in the same rotational direction. So long as the rotational speed of the actuating member 24 is the same as the speed of the speed reference member 54, no axial movement is transmitted to the movable pulley section 30. Depending on whether the speed of the actuating member 24 is greater or less than the speed of the speed reference member 54, the movable pulley section 30 will be shifted to the right or left respectively, as seen in FIGURE 1. Thus, the axial movement of the pulley section 30 is controlled in response to the difference between the output speed of the driven shaft 17 and the reference speed of the reference speed member 54. It will be appreciated that a relative rotation between the actuating member 24 and the reference speed member 54 may be a right or left hand rotation.

To provide lubrication for the movable pulley section 30 and the portion of the shaft 16 on which the pulley section 30 is shifted, suitable lubricant passageways 60 and 61 are provided in the driving shaft 16. A lubricant fitting 62 is provided at the left end of the shaft for receiving the lubricant.

The pulley structure 20 mounted on the driven shaft 17 includes a movable pulley section 63 and a fixed pulley section 64 associated therewith so that a change in the axial position of the movable pulley section 63 results in a change in the effective diameter of the sheave structure 20. The driven shaft 17 is rotatably mounted in ball bearing assemblies 65 and 66 supported in removable end plates 67 and 68 of the housing 11. The driven shaft 17 is adapted for connection to a machine (not shown), which, for example, may be an alternator or other device to be driven at a selected speed.

As shown, the fixed pulley section 64 includes a collar member 69 which is formed of split portions fixedly attached to the shaft 17. The sleeve 48, which serves as the driving pulley, rigidly couples the hub 70 of pulley section 64 to the collar member 69. Like the pulley structure 19 on the driving shaft 16, the pulley structure 20 on the driven shaft 17 includes a pulley section 63 that is axially movable with respect to the shaft 17 on which it is mounted. Pulley section 63 is biased toward the axially fixed pulley section 64 by means of a coil spring 72 which is mounted between the hub 73 of pulley section 63 and an axially fixed retaining ring 74 assembled on the driven shaft 17. With the coil spring 72 as shown in FIGURE 1, the movable pulley section 63 of sheave structure 20 is biased to provide the maximum effective diameter.

The movable pulley section 63 and the portion of the shaft 17, which it slidably engages, is provided with lubrication through suitable lubricant passageways 77 and 78. A lubricant fitting 79 is installed at the end of shaft for the periodic addition of lubricant.

The mechanism 10 regulates the speed of the driven shaft 17 in the following manner: Let us assume that the shafts 16 and 17, as viewed from the left end of FIGURE 1 are rotating in a clockwise direction, that the threaded portions 52 and 53 are right handed, and also that the speed reference member 54 is driven in a clockwise direction at a selected substantially constant reference speed. During the steady state condition the speed reference member 54 and the actuating member 24 will be rotating at the same speeds, and consequently there will be no axial movement of the pulley section 30 since there is no relative rotational movement between the external threads of the speed reference member 54 and the internal threads on the actuating member 24. Thus, during this condition, the driven shaft 17 is rotating at the desired selected speed and no correction in speed is required.

Let us assume that the driving shaft 16 decreases its speed. A decrease in the speed of rotation of the driving shaft 16 will momentarily cause a decrease in the speed of the driven shaft 17. As a result of this decreased speed, the speed of rotation of the actuating member 24 relative to the speed of the rotation of the reference speed member 54, will also momentarily decrease. Consequently, there is a relative rotation between the threaded portion 52 of the actuating member 24 and the threaded portion 53 of the reference speed member 54. The relative rotation causes the axially movable pulley section 30 to be displaced to the left as seen in FIGURE 1. This displacement of the pulley section 30 causes an increase in the effective diameter of pulley structure 19 and a decrease in the effective pulley diameter of the pulley structure 20 thereby increasing the speed ratio (defined as the speed of shaft 17 divided by the speed of shaft 16) to compensate for the deviation in the speed of the driven shaft 17 from a selected value. When the speed of the driven shaft 17 returns to the selected value, the mechanism 10 reverts to its steady state condition.

Let us assume now that the speed of the driving shaft 16 increases and that the speed of the driven shaft 17 momentarily increases above the selected value at which it is desired to maintain the output speed. For this condition of increased input speed, let us further assume that the relative positions of the pulley sections of the sheave structures 19, 20 and belt 18 are as shown in dashed outline. The increase in the rotational speed of the driven shaft 17 will, of course, be reflected by an increase in the speed of rotation of the actuating member 24. The relative rotation between the actuating member 24 and speed reference member 54 will now be opposite to that encountered in the previously described decreased speed condition. Thus, the pulley section 30 will be axially shifted to the right from the position illustrated in dashed outline. The effective diameter of the sheave structure 19 will decrease and the effective diameter of pulley structure 20 will increase. It will be understood, of course, that the release of the wedging pressure of the belt 18 against the spring-biased pulley section 63 caused by the change in the effective diameter of the sheave structure 19, will effect a displacement of pulley section 63 to the right from the position shown in dashed outline and thereby increase the effective diameter of pulley structure 20. Accordingly, the rotational speed of the driven shaft 17 is corrected and maintained at a substantially constant level.

From the foregoing description of the apparatus, it will be apparent that I have provided an improved automatic feedback regulating mechanism in which the speed is controlled by comparing the output speed of the apparatus with a desired reference speed and automatically varying the speed ratio to compensate for deviations in speed from a selected value. Further, it will be apparent that the output speed of the apparatus may be controlled at various selected values by changing the reference rotational speed supplied to the apparatus. Thus, the speed regulating mechanism in accordance with the invention is readily adaptable for driving generators from internal combustion engines that are operated over a wide range of speeds and is adaptable for use as an adjustable output speed drive where a good regulation of the output speed is desired.

Although in the preferred exemplification of the invention, I have shown an arrangement in which the actuating member 24 is rotatably disposed on the driving shaft 16 and the spring biased pulley section 63 is assembled on the driven shaft 17 it will be understood, of course, that these and other parts can be interchanged. Thus, the actuating member can be rotatably disposed on the movable pulley section of the sheave structure on the driven shaft and may be driven directly by the driven shaft. In such an arrangement, the sheave structure on the driving shaft would employ a spring-biased pulley section.

While I have described herein a preferred embodiment of the invention, it will be apparent that many other changes and modifications may be made. It is, therefore, intended in the appended claims to cover all such changes and modifications as fall within the true spirit and of the invention.

What I claim as new and desire to secure by Letters Patent of the United States is:

1. A speed regulating mechanism comprising a driving shaft and a driven shaft, said driving shaft and said driven shaft being rotatably supported, a sheave structure respectively mounted on each of said shafts, a belt operatively connecting said sheave structure, each of said sheave structures having an axially movable pulley section and an axially fixed pulley section, an actuating means on one of said movable pulley sections for adjusting said movable pulley section axially in either direction, said actuating means being rotated proportionally to the speed of said driven shaft and having a threaded portion, a reference speed means having a threaded portion and including a connection for coupling the reference speed means with a reference speed source to drive said reference speed means at a selected rotational speed, said threaded portion of said reference speed means engaging said threaded portion of said actuating means, the difference between the rotational speeds of the threaded portions of said actuating means and said reference speed means thereby causing said one movable pulley section to adjust the speed ratio of said sheaves and thereby maintain the speed of the driven shaft at a selected value.

2. A speed regulating mechanism comprising a driving shaft, a driven shaft, said driving shaft and said driven shaft being rotatably supported, each of said shafts having a variable pitch sheave structure mounted thereon, each of said sheave structures including an axially movable pulley section and an axially fixed pulley section, a belt operatively connecting said sheave structures, a spring biasing means urging one of said axially movable pulley sections inwardly into engagement with its associated fixed pulley section, an actuating means on the other of said axially movable pulley sections, said actuating means being adapted for rotation at a speed proportional to the speed of the driven shaft and having a threaded portion disposed in an axial direction, a reference speed means adapted for rotation at a reference rotational speed and including a threaded portion meshed with the threaded portion of said actuating means, relative rotational movement between said threaded portions causing said other of said axially movable pulley sections to be axially shifted thereby to change the speed ratio of said sheave structures in response to deviations in the speed of the driven shaft in order to maintain the speed thereof at a selected value.

3. A speed regulating mechanism comprising a rotatably supported driving shaft, a rotatably supported driven shaft, sheave structures respectively mounted on said shafts, a belt operatively connecting said sheave structures, each of said sheave structures having a movable pulley section and an axially fixed pulley section, said pulley sections having opposed inclined belt engaging faces and said movable pulley sections being axially adjusted to vary the effective diameter of said sheave structures, a spring biasing means engaging the movable pulley section of one sheave structure and causing said one sheave structure to adjust the effective diameter thereof in response to axial adjustments of the other sheave structure, an actuating means disposed on said other sheave structure, said actuating means having an internally threaded portion disposed in an axial direction, a reference speed member adapted to be rotated at a selected reference speed and having an externally threaded portion engaging said internally threaded portion of said actuating means, said actuating means being driven proportionally to the speed of said driven shaft, said movable pulley section of said other sheave structure being axially shifted in response to the difference between the rotational speeds of said reference speed member and said actuating means to change the speed ratio of such sheave structures to thereby maintain the speed of the driven shaft at a selected value.

4. In a speed regulating mechanism including a driving shaft, a driven shaft, a sheave structure mounted on each of said shafts, and a belt operatively connecting said sheave structures, each of said sheave structures having an axially movable pulley section and an axially fixed pulley section, said axially movable pulley section of one sheave structure being adjusted by the wedging pressure of said belt in response to the axial adjustment of the other sheave structure, an actuating means disposed on said other sheave structure, said actuating means including a threaded portion disposed in an axial direction, a rotatably supported reference speed member having a threaded portion engaging the threaded portion of said actuating means, said actuating means being rotated proportionally to the speed of the driven shaft, the axial position of the movable pulley section of said other sheave structure being adjusted by said actuating means in response to the difference between the rotational speeds of the threaded portion of said actuating means and the threaded portion of said reference speed member thereby to change the speed ratio of said sheave structures and compensate for deviations in the speed of the driven shaft from a selected value to maintain said speed substantially at said selected value.

5. A speed regulating mechanism comprising: a variable speed ratio drive, said variable speed ratio drive including a driving shaft, a driven shaft, and a pair of sheave structures, said sheave structures each having a pair of oppositely disposed cone-shaped pulley sections, one of said pulley sections being axially movable to adjust the effective diameter of the sheave structure and the other pulley section being axially fixed, a belt operatively connecting said sheave structures, a spring means biasing the movable pulley section of one sheave structure inwardly towards the fixed pulley section to change the effective diameter of said one sheave structure in response to changes in the effective diameter of the other sheave structure, an actuating means on said other sheave structure, said actuating means having a threaded portion, said threaded portion being associated with the movable pulley section of said other sheave structure for causing said movable pulley section to be axially shifted, a reference speed member having a threaded portion engaging the threaded portion of said actuating means, said reference speed member bing adapted to rotate at a selected reference speed, said actuating means being axially shifted to change the speed ratio of said sheave structures in response to the difference between the rotational speeds of said threaded portions to thereby maintain the rotational speed of the driven shaft substantially at a selected value.

6. A speed regulating mechanism comprising a rotatably supported driving shaft, a rotatably supported driven shaft, a first sheave structure mounted on said driving shaft, a second sheave structure mounted on said driven shaft, a belt operatively connecting said sheave structures, said first sheave structure having an axially shiftable pulley section to adjust the effective diameter of the said sheave structure, said second sheave structure having spring biased movable pulley section, the effective diameter of said second sheave structure being changed in response to adjustments of the effective diameter of the said first sheave structure, an actuating member rotatably mounted on the axially shiftable pulley section of said first sheave structure, said actuating member being axially fixed with respect to said shiftable pulley section and having a threaded portion, a reference speed member adapted to be driven at a selected reference speed, said reference speed member having a threaded portion meshed with the threaded portion of said actuating member, means for driving said actuating member at a rotational speed proportional to the rotational speed of the driven shaft, said shiftable pulley section of the first sheave structure being axially shifted to in response to the difference between the rotational speed of said actuating member and the rotational speed of said reference speed member thereby causing the speed ratio to be changed to compensate for deviations in the speed of the driven shaft from a selected value corresponding to the reference speed of said reference speed member.

7. A speed regulating mechanism comprising a driving shaft, a driven shaft, means for rotatably supporting said driving and driven shafts, a first sheave structure mounted on said driving shaft, a second sheave structure mounted on said driven shaft, a belt operatively connecting said first and second sheave structures, said first sheave structure having an axially shiftable pulley section, said second sheave structure having a spring-biased movable pulley section, the speed ratio of said first and second sheave structures being varied by adjusting the axially shiftable pulley section of the first sheave structure, an actuating member rotatably mounted on the axially shiftable pulley section of said first sheave structure, said actuating member being axially fixed with respect to said axially shiftable pulley section and having an internally threaded portion, a reference speed member rotatably mounted in said internally threaded portion of the actuating member and having external threads meshing therewith, said reference speed member being adapted for rotation at a selected reference speed, said actuating member having a pulley, said second sheave structure having a pulley, a belt operatively connecting said pulley on said second sheave structure with said pulley of said actuating member to rotate said actuating member at a rotational speed indicative of the rotational speed of the driven shaft, said actuating member causing the axially shiftable pulley section of said first sheave structure to be adjusted in response to the difference between the rotational speeds of the actuating member and the reference speed member thereby compensating for deviations in the speed of the driven shaft from a selected value by changing the speed ratio of the first and second sheave structures.

8. A speed regulating mechanism comprising a variable ratio speed drive including a driving shaft, a driven shaft, sheave structures respectively mounted on said shafts and a belt operatively connecting said sheave structures, said sheave structures each having a pair of relatively adjustable pulley sections, one of said sheave structures having an axially shiftable pulley section, the speed ratio of said variable speed ratio drive being varied by adjusting said shiftable pulley section, an actuating means on said shiftable pulley section, said actuating means including a threaded portion, a reference speed member rotatably supported and including a connection for coupling the reference speed member with a reference speed source to drive said reference speed member at a selected rotational speed, said reference speed member having a threaded portion engaging the threaded portion of said actuating means, said actuating means being driven at a rotational speed proportional to the speed of the driven shaft, the rotational speed of the driven shaft being maintained at a selected value by causing the speed ratio of said sheave structures to change in response to the difference between the rotational speed of said speed reference member and said actuating member to thereby compensate for deviations in the speed of the driven shaft from the selected value.

References Cited in the file of this patent

UNITED STATES PATENTS

| | | |
|---|---|---|
| 2,184,395 | Morse | Dec. 26, 1939 |
| 2,495,078 | Schweichkart | Jan. 17, 1950 |
| 3,048,056 | Wolfram | Aug. 7, 1962 |